(12) United States Patent
Lehnhardt et al.

(10) Patent No.: US 10,043,032 B2
(45) Date of Patent: *Aug. 7, 2018

(54) SYSTEM FOR PROCESSING DATA (71) Applicant: CompuGROUP Medical AG, Koblenz (DE)

(72) Inventors: Jan Lehnhardt, Koblenz (DE); Tobias Rho, Bonn (DE)

(73) Assignee: COMPUGROUP MEDICAL SE, Koblenz (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/886,354

(22) Filed: Feb. 1, 2018

(65) Prior Publication Data

US 2018/0173890 A1    Jun. 21, 2018

Related U.S. Application Data

(62) Division of application No. 15/011,800, filed on Feb. 1, 2016, now Pat. No. 9,898,617.

(30) Foreign Application Priority Data

Aug. 6, 2015  (DE) .................... 20 2015 104 126 U (51) Int. Cl.
*H04L 29/06* (2006.01)
*G06F 21/62* (2013.01)
*G06F 17/30* (2006.01)

(52) U.S. Cl.
CPC .... *G06F 21/6227* (2013.01); *G06F 17/30289* (2013.01); *G06F 17/30327* (2013.01); *G06F 17/30345* (2013.01); *G06F 17/30477* (2013.01)

(58) Field of Classification Search
CPC ........... G06F 21/6227; G06F 17/30477; G06F 17/30345
USPC ........................................................ 713/165
See application file for complete search history.

(56) References Cited

U.S. PATENT DOCUMENTS

| | | | |
|---|---|---|---|
| 9,235,725 B2 * | 1/2016 | Spalka | G06F 21/6218 |
| 9,495,555 B2 * | 11/2016 | Spalka | G06F 21/6218 |
| 9,558,228 B2 * | 1/2017 | Spalka | G06F 21/6218 |
| 9,679,005 B2 * | 6/2017 | Spalka | G06F 21/6218 |
| 2010/0306221 A1 * | 12/2010 | Lokam | G06F 17/30631 |
| | | | 707/759 |

(Continued)

*Primary Examiner* — Teshome Hailu
(74) *Attorney, Agent, or Firm* — Harness, Dickey & Pierce, PLC (57) ABSTRACT

The present disclosure relates to transmitting a request for a set of data records, the request indicating encrypted data items associated with first and second interval boundaries, and selectively traversing a partially ordered set to determine an encrypted data item of the partially ordered set that is associated with an interval boundary of the first and second interval boundaries, based on no cache entries being associated with any encrypted data item associated with the interval boundary. The selectively traversing may include decrypting one or more portions of the partially ordered set, determining the encrypted data item of the partially ordered set, and transmitting a request to retrieve a data element of a linear order annotated to the encrypted data item of the partially ordered set associated with the interval boundary, to cause generation of a new cache entry including the encrypted data item and the data element.

16 Claims, 5 Drawing Sheets

(56) References Cited

U.S. PATENT DOCUMENTS

| | | | | |
|---|---|---|---|---|
| 2015/0095658 A1* | 4/2015 | Spalka | ............... | G06F 21/6218 |
| | | | | 713/190 |
| 2015/0106619 A1* | 4/2015 | Spalka | ............... | G06F 21/6218 |
| | | | | 713/165 |
| 2015/0113292 A1* | 4/2015 | Spalka | ............... | G06F 21/6218 |
| | | | | 713/193 |
| 2016/0253367 A1* | 9/2016 | Spalka | ............... | G06F 21/6218 |
| | | | | 713/167 |
| 2016/0371503 A1* | 12/2016 | Spalka | ............... | G06F 21/6218 |
| 2017/0024425 A1* | 1/2017 | Spalka | ............... | G06F 21/6218 |

* cited by examiner

SYSTEM FOR PROCESSING DATA

CROSS REFERENCE TO RELATED APPLICATION

This application is a divisional application of U.S. application Ser. No. 15/011,800 filed on Feb. 1, 2016, which claims priority under 35 U.S.C. § 119 to German Application No. 202015104126.8, filed on Aug. 6, 2015, the entire contents of each of which are incorporated herein by reference thereto.

BACKGROUND

The present disclosure relates to a system for managing data. Specifically, the disclosure relates to a medical system for allowing exchange of data between multiple devices.

Maintaining confidentiality of data records is of paramount importance for systems such as medical systems that maintain patient's sensitive data. However in the prior art, the growing volumes of such data requires improvements to strike a balance between security of health data and access speed to the health data.

SUMMARY

Various embodiments provide a client-server system, a client system, and a server system as described by the subject matter of the independent claims. Advantageous embodiments are described in the dependent claims. Embodiments of the present invention can be freely combined with each other if they are not mutually exclusive.

In one aspect, the invention relates to a computer system for querying a database residing on a server computer of the computer system, said database storing data records, the database further comprising a relation, wherein the relation comprises data items, wherein the data items are encrypted with a first encryption method in the relation, wherein the data items form a partially ordered set in the relation, the partial order being formed with respect to the data items in non-encrypted form, wherein a referential connection exists assigning each encrypted data item in the relation to a respective data record of the data records, wherein the encrypted data items are annotated with data elements of a linear order in the database, the linear order corresponding the order in which the encrypted data items are stored in the relation with respect to the partial ordered set, the computer system further comprising a client computer,
wherein the client computer is configured for sending to the server computer a request for data records whose associated data items lie within a search interval, the request indicating an encrypted data item forming a first and a second interval boundary of the search interval, respectively;

For each encrypted data item forming the first and second boundaries:
the server computer is configured for determining if a cache entry is associated with the encrypted data item forming the interval boundary, wherein in case a cache entry is not associated with the encrypted data item forming the interval boundary: the client computer is configured for traversing the partially ordered set for determining a respective data item of the partially ordered set forming the interval boundary, wherein for the traversing:
the client computer is configured for: requesting from the server computer one or more portions of data items of the partially ordered set; receiving the requested portions from the server computer; decrypting the data items of the received portions; determining from the decrypted items the respective data item forming the interval boundary; sending a request to the server computer for retrieving the data element of the linear order annotated to the respective encrypted data item that was determined to form the interval boundary;

Further, for the traversing the server computer is configured for generating for the respective encrypted data item that was determined to form the interval boundary a cache entry comprising the respective encrypted data item that was determined to form the interval boundary and the respective data element;
in case a cache entry is associated with the encrypted data item forming the interval boundary, the server computer is configured for retrieving from the cache the data element that is associated with the interval boundary;
wherein, for providing the requested data records the server computer is further configured for identifying all encrypted data items having annotated the elements of linear order in between the data elements that are associated with the data items forming the interval boundaries; and retrieving the requested data records using the identified data elements via their referential connections.

In another aspect, the invention relates to a server computer, the server computer comprising a database, said database storing data records, the database further comprising a relation, wherein the relation comprises data items, wherein the data items are encrypted with a first encryption method in the relation, wherein the data items form a partially ordered set in the relation, the partial order being formed with respect to the data items in non-encrypted form, wherein a referential connection exists assigning each encrypted data item in the relation to a respective data record of the data records, wherein the encrypted data items are annotated with data elements of a linear order in the database, the linear order corresponding the order in which the encrypted data items are stored in the relation with respect to the partial ordered set. The server computer is configured for: receiving from a client computer a request for data records whose associated data items lie within a search interval, the request indicating an encrypted data item forming a first and a second interval boundary of the search interval, respectively; for each encrypted data item forming the first and second boundaries: determining if a cache entry is associated with the encrypted data item forming the interval boundary, in case a cache entry is not associated with the encrypted data item forming the interval boundary receiving from the client computer a request indicating the data element of the linear order annotated to the respective encrypted data item that forms the interval boundary; generating for the respective encrypted data item that was determined to form the interval boundary a cache entry comprising the respective encrypted data item that was determined to form the interval boundary and the respective data element; in case a cache entry is associated with the encrypted data item forming the interval boundary, retrieving from the cache the data element that is associated with the interval boundary; wherein the server computer is further configured for identifying all encrypted data items having annotated the elements of linear order in between the data elements that are associated with the data items forming the interval boundaries; and retrieving the requested data records using the identified data elements via their referential connections.

In another aspect, the invention relates to a client computer of a computer system of claim 1, the computer system comprising a server computer, the server computer comprising a database, said database storing data records, the database further comprising a relation, wherein the relation comprises data items, wherein the data items are encrypted with a first encryption method in the relation, wherein the data items form a partially ordered set in the relation, the partial order being formed with respect to the data items in non-encrypted form, wherein a referential connection exists assigning each encrypted data item in the relation to a respective data record of the data records, wherein the encrypted data items are annotated with data elements of a linear order in the database, the linear order corresponding the order in which the encrypted data items are stored in the relation with respect to the partial ordered set. The client computer is configured for: sending to the server computer a request for data records whose associated data items lie within a search interval, the request indicating an encrypted data item forming a first and a second interval boundary of the search interval, respectively; for each encrypted data item forming the first and second boundaries: in case a cache entry is not associated with the encrypted data item forming the interval boundary: traversing the partially ordered set for determining a respective data item of the partially ordered set forming the interval boundary, wherein for the traversing: requesting from the server computer one or more portions of data items of the partially ordered set; receiving the requested portions from the server computer; decrypting the data items of the received portions; determining from the decrypted items the respective data item forming the interval boundary; sending a request to the server computer for retrieving the data element of the linear order annotated to the respective encrypted data item that was determined to form the interval boundary.

Further a method for querying a database residing on a server computer is described, said database storing data records, the database further comprising a relation, wherein the relation comprises data items, wherein the data items are encrypted with a first encryption method in the relation, wherein the data items form a partially ordered set in the relation, the partial order being formed with respect to the data items in non-encrypted form, wherein a referential connection exists assigning each encrypted data item in the relation to a respective data record of the data records, wherein the encrypted data items are annotated with data elements of a linear order in the database, the linear order corresponding the order in which the encrypted data items are stored in the relation with respect to the partial ordered set, the method comprising:

sending by a client computer to the server computer a request for data records whose associated data items lie within a search interval, the request indicating an encrypted data item forming a first and a second interval boundary of the search interval, respectively;
   for each encrypted data item forming the first and second boundaries:
      determining if a cache entry is associated with the encrypted data item forming the interval boundary, wherein in case a cache entry is not associated with the encrypted data item forming the interval boundary: traversing the partially ordered set by the client computer for determining a respective data item of the partially ordered set forming the interval boundary, the traversing comprising:
         requesting from the server computer one or more portions of data items of the partially ordered set;
         receiving the requested portions from the server computer;
         decrypting the data items of the received portions;
         determining from the decrypted items the respective data item forming the interval boundary;
         sending a request to the server computer for retrieving the data element of the linear order annotated to the respective encrypted data item that was determined to form the interval boundary;
         generating for the respective encrypted data item that was determined to form the interval boundary a cache entry comprising the respective encrypted data item that was determined to form the interval boundary and the respective data element;
      in case a cache entry is associated with the encrypted data item forming the interval boundary, retrieving from the cache the data element that is associated with the interval boundary from the server computer;
   identify all encrypted data items having annotated the elements of linear order in between the data elements that are associated with the data items forming the interval boundaries;
   retrieving the requested data records using the identified data elements via their referential connections.

BRIEF DESCRIPTION OF THE SEVERAL VIEWS OF THE DRAWINGS

In the following embodiments of the invention are explained in greater detail, by way of example only, making reference to the drawings in which.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The term relation refers to a data structure equivalent to a data table, such as a data table of a database system.

A partially ordered set is understood as a set of data elements that formalizes the concept of an ordering, sequencing, or arrangement of the elements of a set. A partially ordered set consists of a set together with a binary relation that indicates that, for certain pairs of elements in the set, one of the elements precedes the other. Such a relation is called a partial order to reflect the fact that not every pair of elements need be related: for some pairs, it may be that neither element precedes in a direct manner the other in the partially ordered set. The data items form the partial ordered set in the relation via a rooted tree. In other terms, the partially ordered set may refer to a data structure in which data items are related to each other in the relation. The data structure may comprise a tree structure such as a rooted tree or a similar indexing data structure with pointers or references to the records which contain the corresponding values associated with the data items. For example, the partially ordered set may comprise an AVL tree or a binary search tree. The tree keeps the data items in sorted order, as this may speed up the traversal of the tree.

The first encryption method may comprise an arbitrary encryption method. For example, the first encryption method may comprise a non-deterministic encryption method, a homomorphic encryption or an order preserving encryption method. The first encryption method, when executed for a given data item, encrypts the data item using for example a cryptographic key. In accordance with an embodiment, the cryptographic key is a symmetric or an asymmetric key. A second encryption method which is the same or different from the first encryption method may be used to encrypt the data records which contain the corresponding values associated with the data items of the partially order set.

A "cryptographic key" as used herein encompasses a symmetric key that serves both for encryption and decryption as well as an asymmetric cryptographic key pair, where the public key is used for encryption and the private key is used for decryption.

The term "data item" as used herein refers to a data value of a data element of a set of elements like for example a tuple that comprises one or more data elements, such as a data value of a data field of a data record that has multiple data fields, within a database, such as a relational data-base, object oriented databases, object relational databases, hierarchical databases, noSQL databases, or in-memory database. For example, a medical data record of a patient may comprise various data elements, e.g. data fields, such as name, address, telephone number and medical data fields of that patient where data values for name, address and telephone number are exemplary data items. A data item may comprise a string of characters that may comprise a plurality of letters, numbers, or both. The data item may comprise a number having integer value or float value etc.

The encrypted data items forming the first and second interval boundary may or may not be part of the relation.

The above features may have the advantage of maximizing both speed and security access to data stored on the server system. The present method and system may save processing time and resources that would otherwise be required processing repeatedly queried search intervals. This embodiment may particularly be advantageous for distributed systems such as the cloud where a very high number of queries and search intervals are processed per day such that the probability of requesting the same search intervals increases.

The present method and system may enable a secure access to the data via the partially ordered set. This may particularly be important for health system's sensitive data.

The manipulation of the data items of the partially ordered set at the server side can be performed without having to decrypt the multiple data items at the server computer i.e. the server computer may have no access to the cryptographic key or the unencrypted content of multiple data items. Thus, the risk of compromising the data items at the server computer may be mitigated.

The present method and system may further have the advantage of enabling a (remote) control access to data via client systems. This may particularly be advantageous for medical related data for which a centralized control access to data may not be suitable. For example, the confidentiality of medical data (e.g. data items and associated data records) may be compromised if an unauthorized user has access to unencrypted content of the medical data.

According to one embodiment, the data item forming the interval boundary is the closest data item of the relation to the interval boundary, the data item being within the search interval. This embodiment may have the advantage of providing accurate range search results.

According to one embodiment, it is further disclosed that a new data item in the rooted tree at the server computer is inserted; and upon inserting the cached entries are deleted by the server computer. The previous range search results may not be reproduced using the cache entries that are generated before the index tree changed e.g. by inserting the new data item.

According to one embodiment, the data items form the partial ordered set in the relation via a rooted tree, wherein each of the data items of the rooted tree is represented by a respective node, the one or more portions comprising subtrees of the rooted tree, all the subtrees having a common predefined height, the height specifying the number of edges on the longest downward path between the root node of the subtree and the leaf level of the subtree. This embodiment may have the advantage of providing a controlled access to the rooted tree by the client computer. The client computer may for example define the required height of the portions to be received from the server system. For example, in case the client system has access to a limited network bandwidth, the client system may adapt the required height of the subtrees accordingly. In another example, the subtrees may have different predefined heights.

According to one embodiment, caching by the client computer the received portions of the partially ordered set. This embodiment may have the advantage of further speeding up the access to the data items. Further, this may save network bandwidth that would otherwise be required for retransmitting the cached portions of the partially ordered set.

According to one embodiment, the data items forming the partial ordered set in the relation via a rooted tree, wherein each of the data items of the rooted tree is represented by a respective node, it is further disclosed that: a new encrypted data item is inserted in the rooted tree at the server computer; in case of detecting an imbalance at a given node, the rooted tree is rebalanced at a rotation point defined by the given node; cached portions that have any nodes along a downward path starting from the root node of a cached portion of the cached portions that contains the given node to the leafs of the rooted tree are deleted by the client computer. This embodiment may prevent usage of outdated portions at the client system, which may result in wrong search results of range searches.

According to one embodiment, deleting the cached portions comprises: re-traversing the rooted tree starting with the new inserted encrypted data item upward to the root node of the rooted tree, the re-traversing resulting in a traversal path; communicating to the client computer the traversal path, the traversal path indicating the rotation point and traversed nodes; using the traversal path for traversing by the client computer the cached portions for identifying in the cached portions a cached portion containing the rotation point; and identifying any nodes along a downward path starting from the root node of the identified cached portion to the leafs of the rooted tree; deleting the identified cached portion and the identified nodes. This embodiment may provide an accurate and systematic method for updating the cache content at the client computer. This may particularly be advantageous for large indexes (e.g. for Big Data) as the deletion may systematically be performed in accordance with this embodiment.

According to one embodiment, the traversing comprises creating by the server computer a bit mask, the bit mask comprising bits associated with respective nodes of the traversal path in the order the nodes are traversed in the traversal path, wherein each bit of the bit mask for a given node has a value indicating if the next node in the traversal path is preceding or succeeding the given node with respect to the order represented by the partial order; sending the bit mask to the client computer; using the bit mask by the client computer to traverse the cached portions. This may provide an accurate method for traversing the portions.

According to one embodiment, the traversal path comprising one or more edges, each edge being defined by a pair of two consecutively ordered nodes, the two consecutively ordered nodes comprising a source node and a target node of the traversal path, the traversing comprises creating by the server computer a bit mask, the bit mask comprising bits associated with edges of the traversal path in the order the edges are traversed in the traversal path, wherein each bit of the bit mask for a given edge has a value indicating if the target node of the edge is preceding or succeeding the source node of the edge with respect to the order represented by the partial order; sending the bit mask to the client computer; using the bit mask by the client computer to traverse the cached portions.

According to one embodiment, it is further disclosed that: the encrypted data item corresponding to the rotation point is communicated to the client computer; the communicated data item is decrypted by the client computer; the decrypted data item is identified in the cache as the given node forming the rotation point.

According to one embodiment, it is further disclosed that: it is determined if a rebalancing of the tree is required using the re-traversal. This may save processing resources by making use of the re-traversal in order to check the balance of the tree. This may prevent an additional traversal for the rebalancing.

According to one embodiment, the partially ordered set comprising an AVL tree. This embodiment may be seamlessly integrated with existing systems.

According to one embodiment, the generated cache entry further indicates that the interval boundary is a lower or an upper interval boundary.

According to one embodiment, it is further disclosed that: a search request is received at the client, wherein the search request comprises a request for a prefix search on a search criterion, wherein the client is operable to determine the search interval by transforming the prefix search into a corresponding interval comprising the search criterion as the lower interval boundary, and a value computationally derived from the search criterion as the upper interval boundary.

Figure 1:
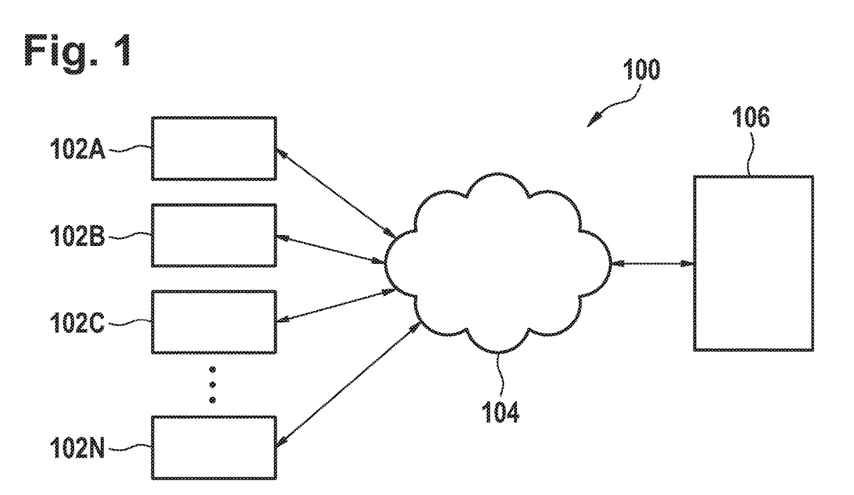
FIG. 1 depicts a schematic block diagram of a client-server system.

FIG. 1 shows a schematic block diagram of a client-server system 100 in accordance with the present disclosure. The client-server system 100 comprises one or more client systems (or client computers) 102A-N and a server system (or server computer) 106. The client system 102A-N and the server system 106 are connected over a network connection 104. The client system 102 can be regarded as a computer system that is able to communicate with the server system 106 via the network connection 104 which comprises for example a wireless local area network (WLAN) connection, WAN (Wide Area Network) connection LAN (Local Area Network) connection or a combination thereof. The server system 106 can be regarded as a computer system that is able to provide data access to the client system 102. In order to access data stored on the server 106, the client system 102 sends a request to the server 106, where the request is received and processed at the server system 106.

For example, client-server system 100 may be a medical system, in which the client system 102 may be part of a medical office or a hospital and the server system 106 may be located in an external database center, like a cloud computing center.

For example, a client system 102 may comprise a portable electronic telecommunication device, such as a mobile radio or a digital cellular mobile telephone, such as a smartphone or tablet computer. This may particularly be beneficial for applications that involve terrestrial users in vehicles or on foot, such as for emergency responder organizations or public works organizations. In the field of the provision of healthcare services this may particularly be beneficial as it may enable the use of a mobile portable battery powered client device in the context of emergency medical services and/or home visits of patients by medical doctors, while maintaining high data privacy standards.

As used herein the term "server" refers to any computerized component (e.g. a software component), system or entity regardless of form that is adapted to provide data, files, applications, content, or other services to one or more other devices or entities.

Figure 2:
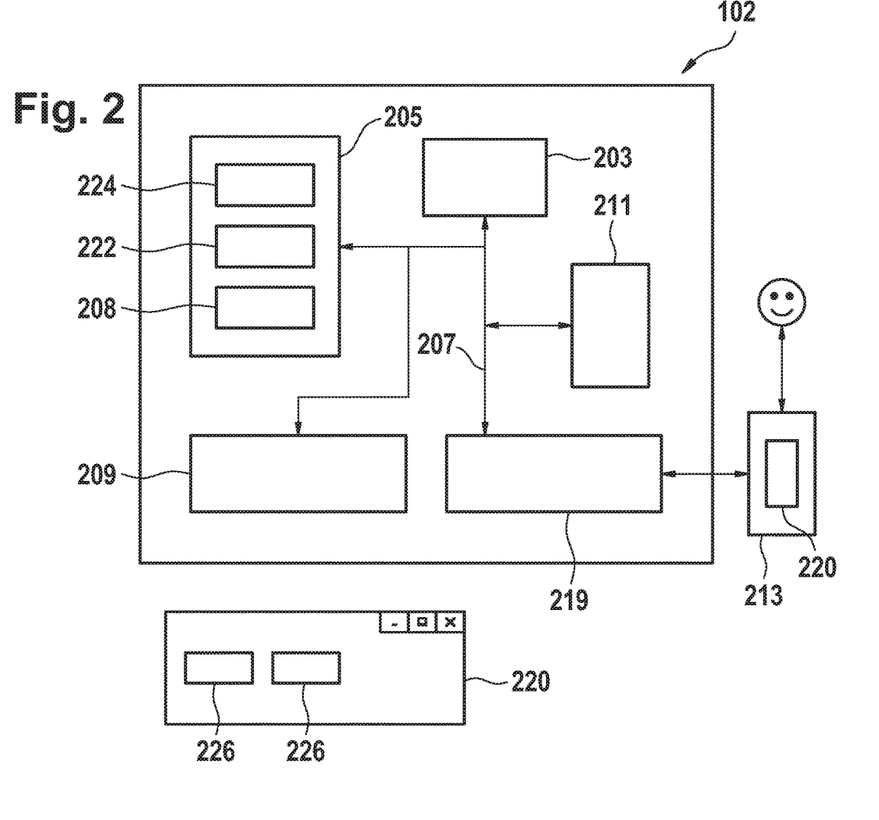
FIG. 2 depicts a schematic block diagram of a server system.

FIG. 2 shows a schematic block diagram of a client system 102 in accordance with the present disclosure. The components of client system 102 may include, but are not limited to, one or more processors or processing units 203, a storage system 211, a memory unit 205, and a bus 207 that couples various system components including memory unit 205 to processor 203. Storage system 211 may include for example a hard disk drive (HDD). Memory unit 205 may include computer system readable media in the form of volatile memory, such as random access memory (RAM) and/or cache memory. Client system 102 typically includes a variety of computer system readable media. Such media may be any available media that is accessible by client system 102, and it includes both volatile and non-volatile media, removable and non-removable media.

Client system 102 may also communicate with one or more external devices such as a keyboard, a pointing device, a display 213, etc.; one or more devices that enable a user to interact with client system 102; and/or any devices (e.g., network card, modem, etc.) that enable client system 102 to communicate with one or more other computing devices. Such communication can occur via I/O interface(s) 219. Still yet, client system 102 can communicate with one or more networks such as a local area network (LAN), a general wide area network (WAN), and/or a public network (e.g., the Internet) via network adapter 209. As depicted, network adapter 209 communicates with the other components of client system 102 via bus 207.

Memory unit 205 is configured to store applications that are executable on the processor 203. For example, the memory system 205 may comprise an operating system as well as application programs. The application programs comprise a data access application 208. The data access application 208 comprises instructions that when executed enable a user of the client system 102 to request data residing on server system 106. For example, the execution of the instructions may cause the processor 203 to display a graphical user interface 220. The graphical user interface 220 comprises search fields 226 that are configured to receive inputs indicative for example of a range or interval searches. The interval search may, for example, represent a string prefix search such as "Ped*". For example, the user may enter a prefix search Ped* into a search field 226 of the graphical user interface 220. The prefix search may be transformed by the data access application 208 into an interval search e.g. ["Ped"; "Pee"[ that would cover the requested data that are associated with users having a name starting with "Ped".

Memory unit 205 is further configured to store a cryptographic key 222. The cryptographic key 222 may be used to encrypt data items that are accessible by the client system 102. for example, since the client system 102 and the server system 106 may be used for handling of medical data records, it may be crucial that any information leaving the client system 102 and thus the environment of a medical office is kept confidential at the destination e.g. server system 106. It has to be ensured that no unauthorized user may have access to patient data records at the server system 106.

The client system 102 may further comprise a cache 224. The term "cache" as used herein refers to a temporary storage area that is a high-speed access area and may be either a memory cache or a disk cache. The cache may, for example, be a portion on memory of high-speed static RAM (SRAM) or may be part of main memory e.g. made up of dynamic RAM (DRAM).

Figure 3:
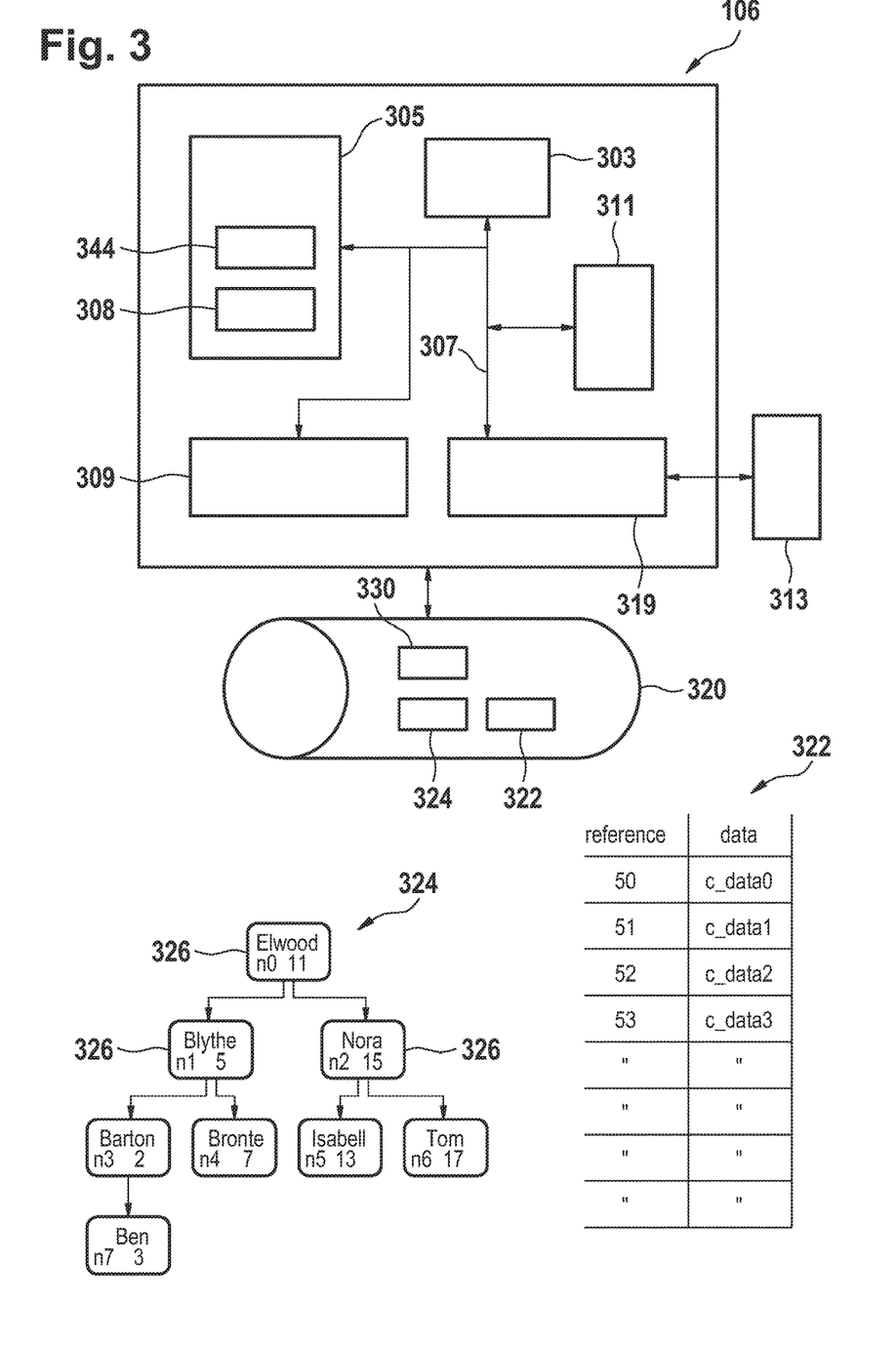
FIG. 3 depicts schematic block diagram of a client system.

FIG. 3 shows a schematic block diagram of a server system 106 in accordance with the present disclosure.

The components of server system 106 may include, but are not limited to, one or more processors or processing units 303, a storage system 311, a memory unit 305, and a bus 307 that couples various system components including memory unit 305 to processor 303. Storage system 311 may include for example a hard disk drive (HDD). Memory unit 305 may include computer system readable media in the form of volatile memory, such as random access memory (RAM) and/or cache memory. Server system 106 typically includes a variety of computer system readable media. Such media may be any available media that is accessible by server system 106, and it includes both volatile and non-volatile media, removable and non-removable media.

Server system 106 may also communicate with one or more external devices such as a keyboard, a pointing device, a display 313, etc.; one or more devices that enable a user to interact with the server system 106; and/or any devices (e.g., network card, modem, etc.) that enable server system 106 to communicate with one or more other computing devices. Such communication can occur via I/O interface(s) 319. Still yet, server system 106 can communicate with one or more networks such as a local area network (LAN), a general wide area network (WAN), and/or a public network (e.g., the Internet) via network adapter 309. As depicted, network adapter 309 communicates with the other components of server system 106 via bus 307.

Memory unit 305 is configured to store applications that are executable on the processor 303. For example, the memory system 305 may comprise an operating system as well as application programs. The application programs comprise a database management system (DBMS) 308 that enables to store, modify, and extract data from database storage 320 of the server system 106. Requests for information from database storage 320 are made for example in the form of queries. For example, the query may be an SQL query. The database storage 320 may comprise a database 322 comprising data e.g. patient data. The content of the database 322 may be encrypted e.g. using the cryptographic key 222 at the client system 102. The data access (e.g. data retrieval) to the database 322 may be performed using a rooted tree 324. For example, the rooted tree 324 may comprise patient names that may be used to access the data in the database 322 that belong to each of the names. The rooted tree 324 may for example be an index, thereby it is referred to herein as index tree 324. The index tree 324 may comprise multiple data items represented by nodes 326. For simplicity of the description data items and nodes are interchangeably used herein. The index tree 324 comprises data items that are encrypted at client computer systems 102. The encryption of the data items of the index tree 324 may be performed using a cryptographic key 222 that is stored at the client system 102 where the encryption is performed. This may prevent the server system 106 from accessing the decrypted content of the data items 326 of the index tree 324.

The data items 326 of the index tree 324 may be sorted in numerical or lexicographical order or a combination thereof. The sorting may be performed using the unencrypted content of the data items of the index tree 324. This may be performed at the client system 102 as the client system 102 may have right access to the unencrypted content of the data items of the index tree 324. In another example, the server system 106 may perform the sorting of the data items 326 of the index tree 324 based on their encrypted content, wherein the data items are encrypted using an order preserving encryption method. This is particularly advantageous as the server system 106 may not have right access to the unencrypted content of the data items 326.

For example, each data item 326 of the index tree 324 may comprise a patient name in the encrypted format and a reference (or referential connection) to data related to that patient in the database 322. The references assign each data item 326 to corresponding data c_data stored in the database 322. The data c_data may be encrypted using the same or different encryption method that is used to encrypt the data items 326. For simplicity of the description the data items 326 are shown in plain text although the data items 326 are encrypted and the server system 106 has no access to the unencrypted (i.e. plain text) content of the data items 326.

For example, the index tree 324 is sorted according to the lexicographic order of the patient names in the unencrypted form. The index tree 324 may or may not be a balanced tree. For example, the index tree 324 may comprise an AVL tree or a binary search tree.

Server system 106 may further comprise a linear list 330. The linear list comprises data elements associated with the data items 326. The elements of linear order are shown in integer numbers, for example 2, 5, 11 etc. The data elements having in the list a linear order corresponding to the order in which the encrypted data items 326 are stored in the index tree 324. The linear list 330 may be used to identify the data items that belong to a given range and search interval. Each element of the linear list 330 may comprise a reference to data of the database 322 that correspond to the data item 326 represented by that element. The usage of the linear list 330 may be advantageous as the access to the linear list may be faster than the access to index tree 324.

The server system 106 may further comprise a cache 344.

The client-server system 100, the client system 102 and the server system 106 will be described in details with reference to FIGS. 4-8.

In the following the terms "relation", "rooted tree", "partially ordered set" and "index tree" are interchangeably used.

Figure 4:
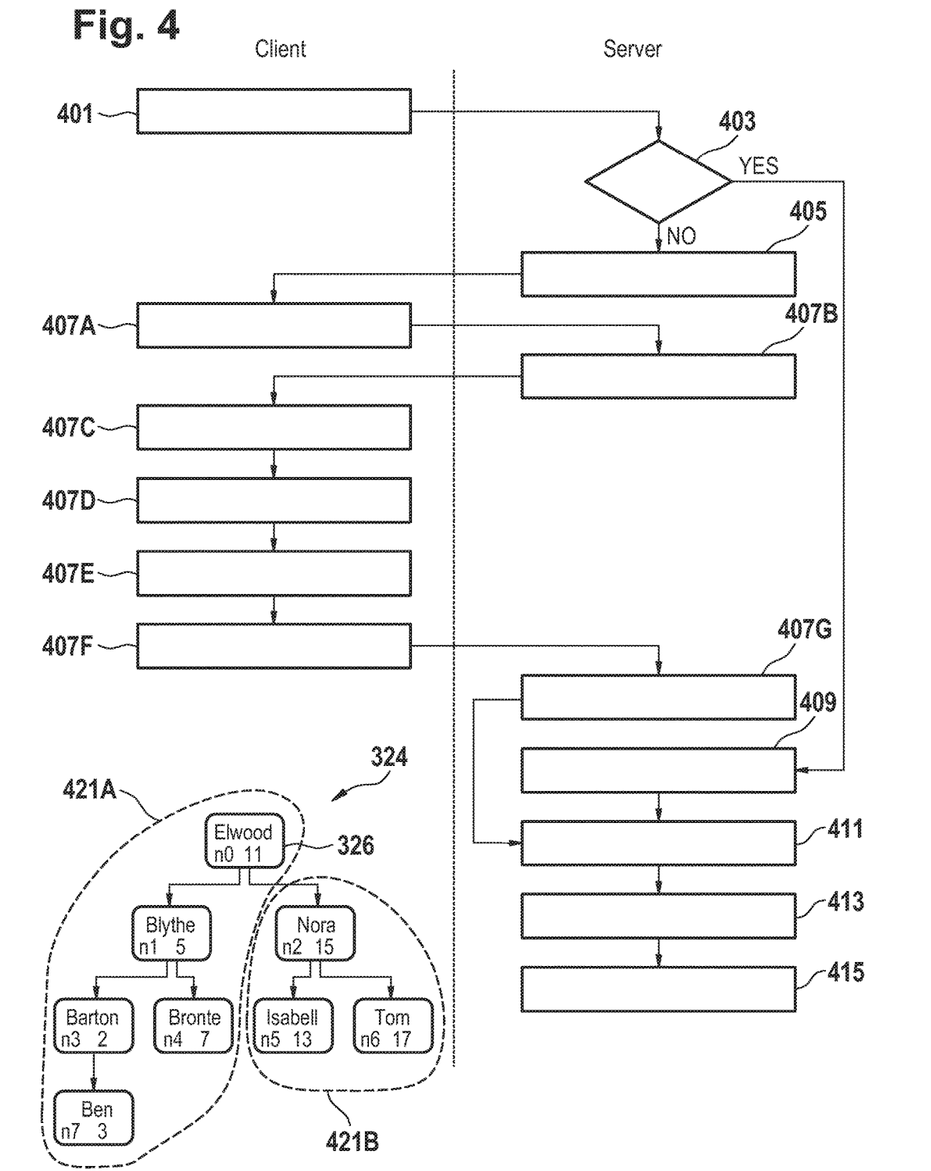
FIG. 4 is a flowchart of a method for querying a database.

FIG. 4 is a flowchart of a method for querying a database e.g. 322 residing on a server system e.g. 106.

In step 401, the client system 102 may send to the server system 106 a request for data records whose associated data items lie within a search interval. The request may for example comprise an SQL query. The request indicates encrypted data items forming a first and a second interval boundary of the search interval respectively. For example, the search interval may represent a string prefix search such as "B*". For example, the user may enter a prefix search "B*" into search field 226 of the graphical user interface 220. The prefix search may be transformed by the data access application 208 into an interval search e.g. ["B"; "C"[, that would cover the requested data records (c_data) that are associated with users having names starting with letter "B". The two interval boundaries, in this example, may comprise the strings "B" and "C" in their encrypted format E(B) and E(C) respectively.

In another example, the search interval may represent a range of ID numbers e.g. from ID=1 to ID=10, wherein the ID indicates a user identification number. For that, the user may enter in fields 226 of the graphical user interface 220 the two interval boundaries 1 and 10. The request that is sent by the client system 102 is for requesting data records (c_data) that are associated with users having an ID lying between 1 and 10.

The server system 106 may check (inquiry 403) the cache 344 in order to determine if a cache entry is associated with the data item forming the interval boundary (as described below, the server system 106 may cache previously requested search intervals). For example, the server system 106 may compare the encrypted data item E(B) or E(C) with the content of cache entries in the cache 344 In one example, the comparison may comprise: upon determining that a cache entry comprises E(B), checking that the cache entry that corresponds to E(B) is also a lower boundary. For example, it may be found that E(B) is stored in a cache entry but that cache entry relates to an upper boundary. This may particularly be advantageous in case the interval boundaries are not stored in pairs e.g. every interval boundary is separately cached.

In case a cache entry is not associated with the data item forming the interval boundary e.g. no cache entry in the cache comprising the encrypted data item E(B), the server system 106 may send in step 405 a notification to the client system 102 indicating that the searched interval is not cached. In another example, the client system 102 may not require the notification from the server system 106. The client system 102 may automatically determine after a given time period that is elapsed starting from the time at which the request of step 401 is submitted that the requested search interval is not cached. For example, the missing cache entry may due to the fact that the cache entry has not been created before for the encrypted data item E(B) or, in another example, the server system 106 may have deleted that cache entry after inserting a new data item by the server system 106 in the index tree 324. This is because the previously requested results may not be reproduced as the index tree 324 has changed.

Thus, upon determining that the data item forming the interval boundary is not cached at the server system 106, the client system 102 may traverse the index tree 324 for determining in step 407 a respective data item of the index tree 324 forming the interval boundary e.g. E(B). The traversing of step 407 may be performed as described with steps 407A-407G.

The client system 102 may request in step 407A from the server system 106 one or more portions (or subtrees) 421A-B of data items of the index tree 324. A portion of the index tree 324 may comprise one or more data items 326. For example, in case the requested portion of the index tree 324 comprises more than one node, the respective request may further indicate the height of the requested portion. The requested portions or subtrees may have a same or different predefined height, wherein the height specifies the number of edges on the longest downward path between the root node of a subtree and the leaf level of that subtree. For example, the client system 102 may specify in the request of a given portion of the index tree 324 the height of that portion irrespective of the position of the portion in the index tree 324. Further or alternatively, the client system 102 may specify in the request the root node or starting node of a given portion of the index tree 324 (e.g. using the leafs of a traversed portion the starting node (or root node) of a subsequent portion to be requested may be determined). The client system 102 may establish a connection via network 104 to the server system 106, and may send successive requests using a protocol such as HTTP to the server system 106. For each of the successive requests, the client system 102 may request a single portion of the index tree 324.

In step 407B, the server system 106 may send the requested portion to the client system 102. For example, the server system 106 may send the requested portion in a response to the client system 102. The server system 106 may determine in which order the portion is to be submitted to the client system 102. For example, the server system 106 may start sending the portion 421A containing the root node of the index tree 324. This may ease the traversal of the portions at the client system 102, as the client system 102 may have to start with the root node for performing the traversal.

In step 407C, the client system 102 may receive the requested portions 421A-B from the server system 106 in one or more responses.

Since the data items of the portions 421A-B are encrypted, the client system 102 may decrypt in step 407D the data items 326 of the received portions 421A-B e.g. using the cryptographic key 222 that has been used to encrypt the data items of the index tree 324 at the client system 102.

Reading the unencrypted content of the data items 326 of the received portions 421, the client system 102 may determine in step 407E from the decrypted items the respective data item forming the interval boundary E(B). For that, the client system 102 may decrypt the data item forming the interval boundary (e.g. E(B)) if the unencrypted content of E(B) is not maintained at the client system 102 (after performing step 401) and may compare the unencrypted content of E(B) which is "B" with the unencrypted content of the data items 326 of the received portions 421A-B. The client system 102 may thus determine that the closest data item of the index tree 324 to "B" is data item "Barton".

Upon determining the data item forming the interval boundary E(B), client system 102 may send in step 407F a request to the server system 106 for retrieving the data element ($II_B$) of the linear order or the linear list 330 that is annotated to the respective encrypted data item that was determined to form the interval boundary in step 407E. For example, the client system 102 may encrypt data item "Barton" using the cryptographic key 222 to obtain E(Barton) and may send E(Barton) in the request to the server system 106 in order to determine e.g. by the server system 106 the data element of the linear list 330 that corresponds to E(Barton). For example, the server system 106 may determine that the data element $II_B$ corresponding to E(Barton) is the integer number 2 as indicated in the index tree 324.

In response to receiving the request of step 407F, the server system 106 may generate in step 407G for the respective encrypted data item that was determined to form the interval boundary E(B) a cache entry comprising the respective encrypted data item E(B) that was determined to form the interval boundary and the respective data element $II_B$. For example, a triple (E(B), lower, $II_B$) may be stored in the cache entry to indicate the interval boundary. The string "lower" ("upper") indicates that the interval boundary is a lower (upper) interval boundary.

However, in case (inquiry 403) a cache entry is associated with a data item forming the interval boundary (E(B)), the server system 106 may retrieve in step 409 from the cache 344 the data element $II_B$ that is associated with the interval boundary "B" by for example reading the triple (E(B), lower, $II_B$). In this case, the present method may save resources that would otherwise be required to perform steps 405-407.

Steps 405-409 may be repeated for the other interval boundary "C" in order to determine the data item 326 of the index tree 324 that forms the interval boundary "C". In the example shown in FIG. 4, the data item "Bronte" may be data item that forms the interval boundary "C".

In step 411, all encrypted data items having annotated elements of the linear list that lie between the data elements (e.g. $II_B$ and $II_C$) that are associated with the data items ("Barton" and "Bronte") forming the interval boundaries "B" and "C" may be identified. For example, the linear list 330 may be used to extract data elements that lie between $II_B$ and $II_C$ in the linear list 330. Those data elements may represent in the example of FIG. 4 data items "Ben", "Blyte" as they have integer numbers lying between 2 and 7 of the "Barton" and "Bronte" respectively. The elements of the linear list 330 associated with the data items "Barton", Ben", "Blyte" and "Bronte" may indicate their respective references r3, r7, r1 and r4. Those references may be used by the server system 106 to retrieve in step 413 the data records that are requested and which correspond to the searched interval ["B", "C"[.

In step 415, the server system 106 may send the requested data records to the client system 102.

In one example, step 411 may be performed by the server system 106. This may be advantageous in case of limited network bandwidth in the client server system 100, as it may not be required to send the elements $II_B$ and $II_C$ to the client system 102.

In another example, step 411 may be performed by the client system 102. For that, the client system 102 may receive the data elements $II_B$ and $II_C$ that are associated with the interval boundaries "B" and "C" from the server system 106, and may perform the identification using the linear list 330 that may also be stored at the client system 102. After that, the client system 102 may send the identified data elements to the server system 106. This may have the advantage of enforcing the secure aspect of the present method, as the client system may full control on the data access at the server system 106.

Figure 5:
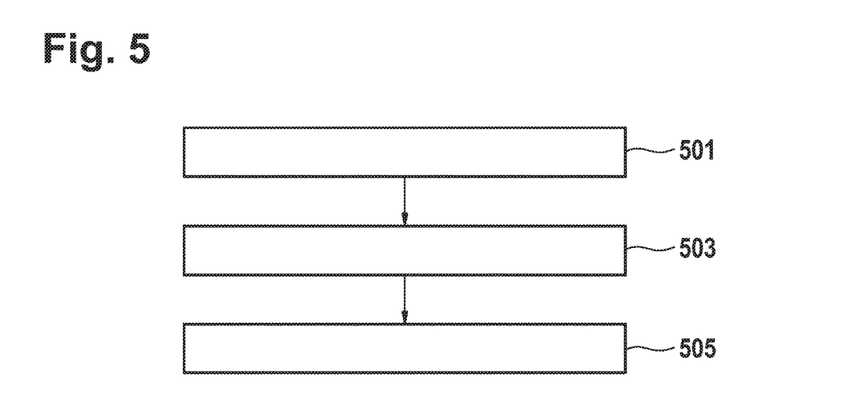
FIG. 5 is a flowchart of a method for controlling access to cached portions of an index tree at the client system.

FIG. 5 is a flowchart of a method for controlling access to cached portions 421A-B at the client system 102. For example, the client system 102 may cache received portions 421A-B of the index tree 324 (of step 407C) in the cache 224.

In step 501, a new encrypted data item 326 may be inserted in the index tree 324 at the server system 106.

Upon inserting the new encrypted data item and in case of detecting an imbalance at a given node 326 of the index tree 324, the server system 106 may rebalance in step 503 the index tree 326 at a rotation point defined by the given node. As the index has been updated and rebalanced, the server system 106 may send a notification to the client system 102 indicating that the new encrypted data item has been inserted in the index tree 324. The client system 102 may thus delete in step 505 cached portions that have any nodes along a downward path starting from the root node of a cached portion of the cached portions that contains the given node to the leafs of the rooted tree. This may prevent usage of outdated portions of the index tree 324 at the client system 102.

Figure 6:
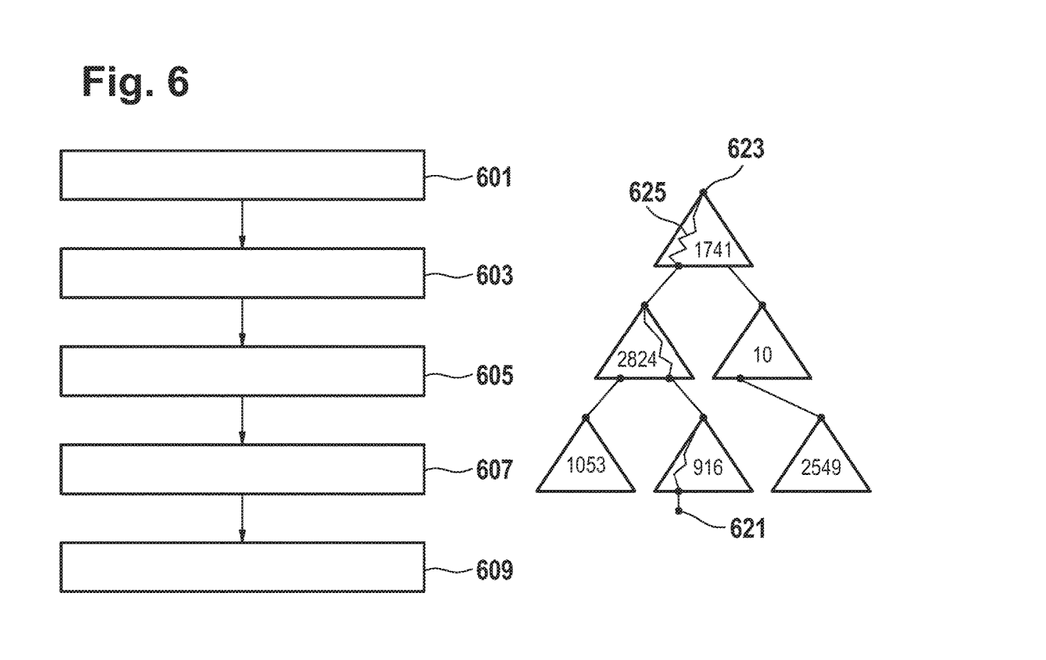
FIG. 6 is a flowchart of a method for deleting outdated cached portions of the index tree.

FIG. 6 is a flowchart of a method further detailing step 505. In step 601, the server system 106 may re-traverse the index tree 324 starting with the new inserted encrypted data item 621 upward to the root node 623 of the index tree 324. The retraversing resulting in a traversal path 625 as illustrated in FIG. 6. The retraversing may automatically be performed by the server system 106. In another example, the server system 106 may receive an instruction from the client system 102 in order to perform the retraversing.

In step 603, the server system 106 may communicate to the client system the traversal path 625. The traversal path may indicate/comprise the traversed nodes and may also indicate the rotation point. For example, one of the traversed nodes of the traversal that corresponds to the rotation point may be flagged to indicate that it is the rotation point. In another example, the node (data item) that corresponds to the rotation pint may be sent in addition to the traversal path. The traversal path 625 may be sent in the form of a text file or a data structure (or using a bit mask as described with reference to FIG. 7) indicating the data items corresponding to nodes of the index tree 324 that have been re-traversed and indicating the order in which the nodes of the traversal path may be traversed. For example, a numbering may be used so as to allow the client system to follow the numbering in order to the traverse the nodes of the traversal path. Wherein the numbering assign to each node (data item) a corresponding number e.g. first (or starting) node of the traversal path may be first numbered (e.g. 1), second traversed node may be numbered 2 and so on.

Upon receiving the traversal path 625, the client system 102 may use in step 605 the traversal path 625 (e.g. data indicated in the text file) for traversing by the client system 102 the cached portions 421A-B for identifying a cached portion containing the rotation point 627 in the cached portions 421A-B.

In step 607, the client system 102 may identify in the cached portions 421A-B any nodes along a downward path starting from the root node of the identified cached portion to the leafs of the index tree 324.

In step 609, the client system 102 may delete the identified cached portion and the identified nodes.

Figure 7:
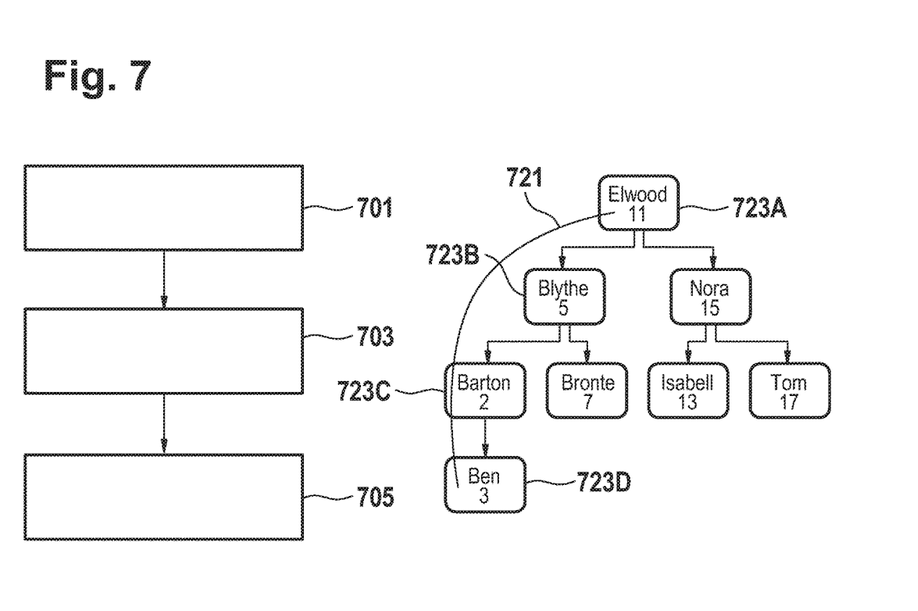
FIG. 7 is a flowchart of an exemplary method for traversing cached portions of the index tree.

FIG. 7 is a flowchart of an exemplary method for performing the traversing of step 605. For simplicity of the description the traversal path 721 is shown as comprising edges linking traversed nodes 723A-D. Each edge is defined by a pair of two consecutively ordered nodes. For example, the first ordered edge is defined by nodes 723A and 723B. The second edge is defined by nodes 723B and 723C. The third edge is defined by nodes 723C and 723D.

In step 701, the server system 106 may create a bit mask to describe or indicate the traversal path and the nodes of the traversal path. The bit mask comprises bits associated with respective edges of the traversal path in the order the nodes are traversed in the traversal path. Each bit of the bit mask for a given edge has a value indicating if the target node in the traversal path is preceding or succeeding the source node with respect to the order represented by the partial order. The target and source node define the given edge. Considering the example of traversal path 721 that passes through nodes 723A-D. The bit mask in this case may comprise 3-bits each associated with one of the three edges defined by pairs 723A-B, 723B-C and 723C-D respectively. The first bit value for the edge defined by nodes 723A-B may indicate that the node 723B has an order smaller than the order of node 723A (i.e. "Blythe" is preceding "Elwood" in the order used for the index tree 324). For example, the first bit value may be equal 0 to indicate that node 723B is preceding in order node 723B. The second bit value for the second edge defined by nodes 723B-C may have the same value 0 for the same reason as described for the first bit. The third bit of third edge defined the nodes 723C-D however may have another bit value e.g. 1 to indicate that node 723D has an order succeeding the node 723C.

In step 703, the server system 106 may send the created bit mask to the client system 102. And, upon receiving by the client system 102 the bit mask from the server system 106, the client system 102 may use in step 705 the bit mask to traverse the cached portions. The client system 106 may for example receive from the server system 106 instructions in order to interpret the bit values as described above. For example, the portion 421A may be traversed starting from the root node by reading each of the bit values the client system may traverse the portion 421A along the traversal path 721.

Figure 8:
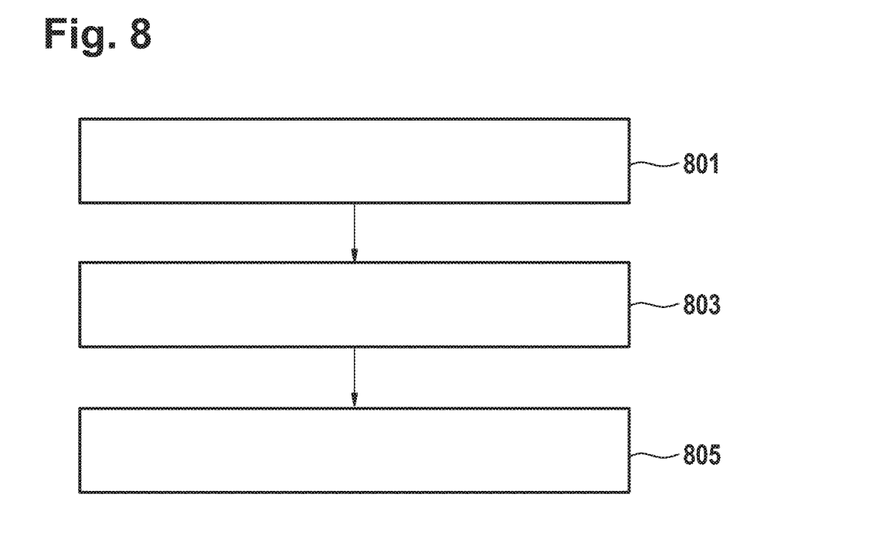
FIG. 8 is a flowchart of another exemplary method for traversing cached portions of the index tree.

FIG. 8 is flowchart of a method for performing the traversing of step 605.

In step 801, the server system 106 may communicate the encrypted data item corresponding to the rotation point 627 to the client system 102 via network 104.

In step 803, in response to receiving encrypted data item corresponding to the rotation point 627, the client system may decrypt the received encrypted data item. This may for example be done using the cryptographic key 222.

In step 805, the client system 102 may identify the decrypted data item in the cache 224 as the given node forming the rotation point 627.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In the following an example method for server and client caching is described.

A first caching approach is to store temporary range search results on the server computer. For instance, consider one client computer having submitted a range search for all values of index 324 (referred to as IX) lying in [a, b], which may initiate two tree traversals with the result of a pair of closest match candidates x and y for a and b respectively, wherein x and y are data items of the index 324.

This may be followed by a selection of all index items whose linear list number (e.g. in the linear list 330) lies between the linear list numbers of x and y:

$$O_{Value \in [a,b]}(IX) = O_{II \in [II_x, II_y]}(IX) = rs$$

The resulting tuple set rs could be stored on the server computer, in case another client computer issues the exact same query for index values lying in [a, b].

A more compact caching method is also described: For [a, b] instead of rs a triple for each interval border value: (E(a), lower, $II_x$) and (E(b), upper, $II_y$), with E(a) and E(b) being the encrypted border value, which is used as an identifier, "lower" and "upper" being the border type (may also used as part of an identifier)

$II_x$ and $II_y$ being the linear list value of the closest match in the current tree extension for the given interval border, a and b.

When a client computer submits a range search request for [a, b], the client computer first encrypts a and b and sends (E(a), lower) and (E(b), upper) to the server computer, where the cache is scanned for possible hits. If one cache hit occurs or both, the according triple's linear list number is fetched for the final selection of the range search operation. If not, tree traversal starts as described above (e.g. for identifying the IIx and IIy).

A cached triple can be outdated when the index 324 is changed, e.g., when an index item value is inserted whose value is a closer match for the triple's encrypted interval border. In that case, the triple needs to be erased from the cache. This may for example be done by erasing the server cache 344 every time the index changes.

In the following client caching is described.

Client Caching

In order to avoid as many redundant subtree retrievals as possible, subtrees that have been retrieved during previous searches can be stored on the client computer for later use. The "root subtree" for instance, i.e., the highest subtree below the entire tree's root node, may always be needed, because every traversal may start there. Other cached subtrees may be useful as well if the client computer searches for nodes or intends to insert nodes within close distance of previous tree accesses. Note that the same kind of subtrees may be retrieved for both read and write accesses.

So, after its retrieval, the subtree below the node with id i is stored on the client computer as a cache entry. The cache entry may contain the subtree's $k \leq 2^h - 1$ nodes and its root node's id i may be used as an identifier. It may also be advantageous to flag a cache entry as being the root subtree $r_{root}$, such that a cache entry $r_i$ is of the following structure:

$$r_i = (i, \{(id_{i,1}, left_{i,1}, right_{i,1}, cData_{i,1}), \ldots, (idi,k, lefti,k, righti,k, cDatai,k)\}, isRoot)$$

So when a subtree with root node id i is needed during tree traversal, the client computer may first check its cache 224 whether it contains an entry ri; if it does not, a server call getSubtree(i) is submitted.

Erasing the cache may be necessary when the index 324 has been modified such that the cached subtrees are no longer consistent with their counterparts in the index's current extension in the database, i.e., when a new item is inserted into or deleted from the index 324. Without restriction to generality we consider only index insertions in the following of this subsection; nevertheless, the presented concepts apply as well to indexes that allow deletions.

For example, cache erasure may be done upon every index modification; whenever an item is inserted into the index 324, all currently connected clients are notified to erase all their cache entries.

In another example, when a new item is inserted into the index 324, the binary tree representation of the index items' linear order, which may for example be implemented using an AVL tree, may need to be rebalanced. The server computer does this by re-traversing the new node's traversal path back to the tree root, checking the balance of each node along the path.

In case of an imbalance, depending on its type, an appropriate rebalancing operation ("rotation") is performed on a node (that node is referred to as the "rotation point" in the following) of the index. It changes the positions, child-parent relations and subtree heights of several nodes around the rotation point. At most one such rotation can occur during rebalancing, so if a rotation has occurred, the entire AVL tree is rebalanced, and the re-traversal is aborted. The balance of all nodes lying outside of the traversal path is not affected by the entire insert and rebalancing operation.

Combining the rotation on the re-traversal path with cached subtrees is best illustrated by an example. FIG. 6 shows a set of cache entries ri identified by their respective root node id, and a traversal path of a new node $v_x$ inserted at the leaf level of $r_{916}$. Since the traversal path crosses only $r_{916}$, $r_{2824}$ and $r_{1741}$, the other three cache entries $r_{1053}$, $r_{2549}$ and $r_{10}$ are not affected by the insertion. Moreover, supposing $v_x$'s insertion has caused a rotation in $r_{2824}$, this affects merely $r_{2824}$ itself, while the other cache entries hosting the traversal path, $r_{1741}$ and $r_{916}$, remain unchanged.

Hence, in one example only that cache entry in which the rebalancing operation happens may need to be erased ($r_{2824}$ in this example), and all others can remain. In another example more cache entries may be erased for the following reason:

A rotation that occurs in a subtree may not change balances and heights of the nodes in the subtree's child subtrees, but it may change the tree levels of some of those nodes. Because subtrees are retrieved with a defined height, this may render a subtree's cached child subtrees useless, and in special cases even erroneous.

In this example, supposing a subtree height h=5, the root nodes $v_{1053}$ and $v_{916}$ of $r_{1053}$ and $r_{916}$ are both located at tree level 11 before the rotation. After the rotation these tree levels may have changed to 10 and 12 or vice versa. Yet during all tree traversals, only subtrees with root nodes at tree level 1, 6, 11, 16 etc are requested, and $r_{1053}$ and $r_{916}$ would remain in the client cache as dead entries.

Hence, the cache entry with the subtree containing the rotation point and all cache entries with that subtree's transitive child subtrees as well, e.g., cache entries r2824, r1053 and r916 is erased. All other subtrees, and especially all subtrees along the traversal path above the subtree containing the rotation point can remain in the cache.

The invention may be described by the following feature combinations.

1. A method for querying a database residing on a server computer, said database storing data records, the database further comprising a relation, wherein the relation comprises data items, wherein the data items are encrypted with a first encryption method in the relation, wherein the data items form a partially ordered set in the relation, the partial order being formed with respect to the data items in non-encrypted form, wherein a referential connection exists assigning each encrypted data item in the relation to a respective data record of the data records, wherein the encrypted data items are annotated with data elements of a linear order in the database, the linear order corresponding the order in which the encrypted data items are stored in the relation with respect to the partial ordered set, the method comprising:
   sending by a client computer to the server computer a request for data records whose associated data items lie within a search interval, the request indicating an encrypted data item forming a first and a second interval boundary of the search interval, respectively;
   for each encrypted data item forming the first and second boundaries:
   determining if a cache entry is associated with the encrypted data item forming the interval boundary, wherein in case a cache entry is not associated with the encrypted data item forming the interval boundary:
   traversing the partially ordered set by the client computer for determining a respective data item of the partially ordered set forming the interval boundary, the traversing comprising:
   requesting from the server computer one or more portions of data items of the partially ordered set;
   receiving the requested portions from the server computer;
   decrypting the data items of the received portions;
   determining from the decrypted items the respective data item forming the interval boundary;
   sending a request to the server computer for retrieving the data element of the linear order annotated to the respective encrypted data item that was determined to form the interval boundary;
   generating for the respective encrypted data item that was determined to form the interval boundary a cache entry comprising the respective encrypted data item that was determined to form the interval boundary and the respective data element;
   in case a cache entry is associated with the encrypted data item forming the interval boundary, retrieving from the cache the data element that is associated with the interval boundary from the server computer;
   identify all encrypted data items having annotated the elements of linear order in between the data elements that are associated with the data items forming the interval boundaries;
   retrieving the requested data records using the identified data elements via their referential connections.

2. The method of feature combination 1, wherein the data item forming the interval boundary is the closest data item of the relation to the interval boundary, the data item being within the search interval.

3. The method of any of the previous feature combinations, further comprising:
   inserting a new data item in the rooted tree at the server computer; and
   upon inserting deleting by the server computer the cached entries.

4. The method of any of the previous feature combinations, wherein the data items form the partial ordered set in the relation via a rooted tree, wherein each of the data items of the rooted tree is represented by a respective node, the one or more portions comprising subtrees of the rooted tree, all the subtrees having a common predefined height, the height specifying the number of edges on the longest downward path between the root node of the subtree and the leaf level of the subtree.

5. The method of any of the previous feature combinations, further comprising: caching by the client computer the received portions of the partially ordered set.

6. The method of feature combination 5, the data items forming the partial ordered set in the relation via a rooted tree, wherein each of the data items of the rooted tree is represented by a respective node, the method further comprising:

inserting a new encrypted data item in the rooted tree at the server computer;

in case of detecting an imbalance at a given node, rebalancing the rooted tree at a rotation point defined by the given node;

deleting by the client computer cached portions that have any nodes along a downward path starting from the root node of a cached portion that contains the given node to the leafs of the rooted tree.

7. The method of feature combination 6, deleting the cached portions comprising:

re-traversing the rooted tree starting with the new inserted encrypted data item upward to the root node of the rooted tree, the re-traversing resulting in a traversal path;

communicating to the client computer the traversal path, the traversal path indicating the rotation point and the traversed nodes;

using the traversal path for traversing by the client computer the cached portions for identifying a cached portion containing the rotation point;

identifying in the cached portions any nodes along a downward path starting from the root node of the identified cached portion to the leafs of the rooted tree;

deleting the identified cached portion and the identified nodes.

8. The method of feature combination 7, the traversal path comprising one or more edges, each edge being defined by a pair of two consecutively ordered nodes, the two consecutively ordered nodes comprising a source node and a target node of the traversal path, the traversing comprises creating by the server computer a bit mask, the bit mask comprising bits associated with the edges of the traversal path in the order the edges are traversed in the traversal path, wherein each bit of the bit mask for a given edge has a value indicating if the target node of the edge is preceding or succeeding the source node of the edge with respect to the order represented by the partial order; sending the bit mask to the client computer; using the bit mask by the client computer to traverse the cached portions.

9. The method of feature combination 7, further comprising:

communicating the encrypted data item corresponding to the rotation point to the client computer;

decrypting the communicated data item by the client computer;

identifying the decrypted data item in the cache as the given node forming the rotation point.

10. The method of any of the previous feature combinations 7-9, further comprising determining if a rebalancing of the tree is required using the re-traversal.

11. The method of any of the previous feature combinations, the partially ordered set comprising an AVL tree.

12. The method of feature combination 1, wherein the generated cache entry further indicates that the interval boundary is a lower or an upper interval boundary.

13. The method of any of the previous feature combinations, further comprising receiving a search request at the client, wherein the search request comprises a request for a prefix search on a search criterion, wherein the client is operable to determine the search interval by transforming the prefix search into a corresponding interval comprising the search criterion as the lower interval boundary, and a value computationally derived from the search criterion as the upper interval boundary.

A method for a server computer, the server computer comprising a database, said database storing data records, the database further comprising a relation, wherein the relation comprises data items, wherein the data items are encrypted with a first encryption method in the relation, wherein the data items form a partially ordered set in the relation, the partial order being formed with respect to the data items in non-encrypted form, wherein a referential connection exists assigning each encrypted data item in the relation to a respective data record of the data records, wherein the encrypted data items are annotated with data elements of a linear order in the database, the linear order corresponding the order in which the encrypted data items are stored in the relation with respect to the partial ordered set, the method comprising:

receiving from a client computer a request for data records whose associated data items lie within a search interval, the request indicating an encrypted data item forming a first and a second interval boundary of the search interval, respectively;

for each encrypted data item forming the first and second boundaries:

determining if a cache entry is associated with the encrypted data item forming the interval boundary, in case a cache entry is not associated with the encrypted data item forming the interval boundary:

receiving from the client computer a request indicating the data element of the linear order annotated to the respective encrypted data item that forms the interval boundary;

generating for the respective encrypted data item that was determined to form the interval boundary a cache entry comprising the respective encrypted data item that was determined to form the interval boundary and the respective data element;

in case a cache entry is associated with a data item forming the interval boundary, retrieving from the cache the data element that is associated with the interval boundary;

wherein the server computer is further configured for identifying all encrypted data items having annotated the elements of linear order in between the data elements that are associated with the data items forming the interval boundaries; and retrieving the requested data records using the identified data elements via their referential connections.

A method for a client computer of a computer system of the previous embodiments, the computer system comprising a server computer, the server computer comprising a database, said database storing data records, the database further comprising a relation, wherein the relation comprises data items, wherein the data items are encrypted with a first encryption method in the relation, wherein the data items form a partially ordered set in the relation, the partial order being formed with respect to the data items in non-encrypted form, wherein a referential connection exists assigning each encrypted data item in the relation to a respective data record of the data records, wherein the encrypted data items are annotated with data elements of a linear order in the database, the linear order corresponding the order in which the encrypted data items are stored in the relation with respect to the partial ordered set, the method comprising:

sending to the server computer a request for data records whose associated data items lie within a search interval, the request indicating an encrypted data item forming a first and a second interval boundary of the search interval, respectively;
for each encrypted data item forming the first and second boundaries:
in case a cache entry is not associated with the encrypted data item forming the interval boundary: traversing the partially ordered set for determining a respective data item of the partially ordered set forming the interval boundary, wherein for the traversing:
requesting from the server computer one or more portions of data items of the partially ordered set;
receiving the requested portions from the server computer;
decrypting the data items of the received portions;
determining from the decrypted items the respective data item forming the interval boundary;
sending a request to the server computer for retrieving the data element of the linear order annotated to the respective encrypted data item that was determined to form the interval boundary.

A computer program product, the computer program product comprising a computer readable storage medium having program instructions embodied therewith, the program instructions executable by a processor to cause the processor to perform any of the previous feature combinations.

The invention claimed is:

1. A method, comprising:
transmitting a request for a set of data records, the request indicating encrypted data items associated with a first interval boundary of a search interval and a second interval boundary of the search interval; and
selectively traversing a partially ordered set to determine an encrypted data item of the partially ordered set that is associated with an interval boundary of the first interval boundary and the second interval boundary, based on a determination that no cache entries of a cache are associated with any encrypted data item associated with the interval boundary, the selectively traversing including,
  decrypting one or more portions of a set of data items of the partially ordered set,
  determining the encrypted data item of the partially ordered set associated with the interval boundary from the decrypted one or more portions, and
  transmitting a request to retrieve a data element of a linear order annotated to the encrypted data item of the partially ordered set associated with the interval boundary, to cause generation of a new cache entry including the encrypted data item and the data element,
wherein
  the set of data items form the partially ordered set via a rooted tree;
  each data item of the set of data items of the rooted tree is represented by a respective node; and
  the method further includes deleting cached portions that have any nodes along a downward path starting from a root node of a cached portion that contains a given node to leafs of the rooted tree, based on a detection of an imbalance at a given node.

2. The method of claim 1, wherein the encrypted data item associated with the interval boundary is a closest data item of a relation to the interval boundary, the data item being within the search interval.

3. The method of claim 1, further comprising: caching the one or more portions.

4. The method of claim 1, the deleting including re-traversing the rooted tree starting with a new inserted encrypted data item upward to a root node of the rooted tree, the re-traversing resulting in a traversal path;
communicating the traversal path, the traversal path indicating a rotation point and traversed nodes;
using the traversal path to traverse the cached portions to identify a cached portion containing the rotation point;
identifying in the cached portions any nodes along a downward path starting from the root node of the identified cached portion to leafs of the rooted tree; and
deleting the identified cached portion and the identified nodes.

5. The method of claim 4, further comprising:
decrypting the encrypted data item corresponding to the rotation point; and
identifying the decrypted data item in the cache as the given node forming the rotation point.

6. The method of claim 1, wherein the partially ordered set includes an AVL tree.

7. The method of claim 1, wherein the generated new cache entry further indicates that the interval boundary is a lower interval boundary of the search interval or an upper interval boundary of the search interval.

8. The method of claim 7, further comprising:
receiving a search request, the search request including a request for a prefix search on a search criterion;
determining the search interval based on transforming the prefix search into a corresponding interval comprising the search criterion as the lower interval boundary, and a value computationally derived from the search criterion as the upper interval boundary.

9. A computer, comprising:
a memory storing a program of instructions; and
a processor configured to execute the program of instructions to
  transmit a request for a set of data records, the request indicating encrypted data items associated with a first interval boundary of a search interval and a second interval boundary of the search interval, and
  selectively traverse a partially ordered set to determine an encrypted data item of the partially ordered set that is associated with an interval boundary of the first interval boundary and the second interval boundary, based on a determination that no cache entries of a cache are associated with any encrypted data item associated with the interval boundary, the selectively traversing including,
    decrypting one or more portions of a set of data items of the partially ordered set, determining the encrypted data item of the partially ordered set associated with the interval boundary from the decrypted one or more portions, and
    transmitting a request to retrieve a data element of a linear order annotated to the encrypted data item of the partially ordered set associated with the interval boundary, to cause generation of a new cache entry including the encrypted data item and the data element, wherein
  the set of data items form the partially ordered set via a rooted tree,
    each data item of the set of data items of the rooted tree is represented by a respective node, and
    the processor is further configured to execute the program of instructions to delete cached portions that have any nodes along a downward path starting from a root node of a cached portion that contains a given node to leafs of the rooted tree, based on a detection of an imbalance at a given node.

10. The computer of claim 9, wherein the encrypted data item associated with the interval boundary is a closest data item of a relation to the interval boundary, the data item being within the search interval.

11. The computer of claim 9, the processor further configured to execute the program of instructions to cache the one or more portions.

12. The computer of claim 9, the deleting including
re-traversing the rooted tree starting with a new inserted encrypted data item upward to a root node of the rooted tree, the re-traversing resulting in a traversal path;
communicating the traversal path, the traversal path indicating a rotation point and traversed nodes;
using the traversal path to traverse the cached portions to identify a cached portion containing the rotation point;
identifying in the cached portions any nodes along a downward path starting from the root node of the identified cached portion to leafs of the rooted tree; and
deleting the identified cached portion and the identified nodes.

13. The computer of claim 12, the processor further configured to execute the program of instructions to
decrypt the encrypted data item corresponding to the rotation point; and
identify the decrypted data item in the cache as the given node forming the rotation point.

14. The computer of claim 9, wherein the partially ordered set includes an AVL tree.

15. The computer of claim 9, wherein the generated new cache entry further indicates that the interval boundary is a lower interval boundary of the search interval or an upper interval boundary of the search interval.

16. The computer of claim 15, the processor further configured to execute the program of instructions to
receive a search request, the search request including a request for a prefix search on a search criterion; and
determine the search interval based on transforming the prefix search into a corresponding interval comprising the search criterion as the lower interval boundary, and a value computationally derived from the search criterion as the upper interval boundary.

* * * * *